Patented Feb. 13, 1923.

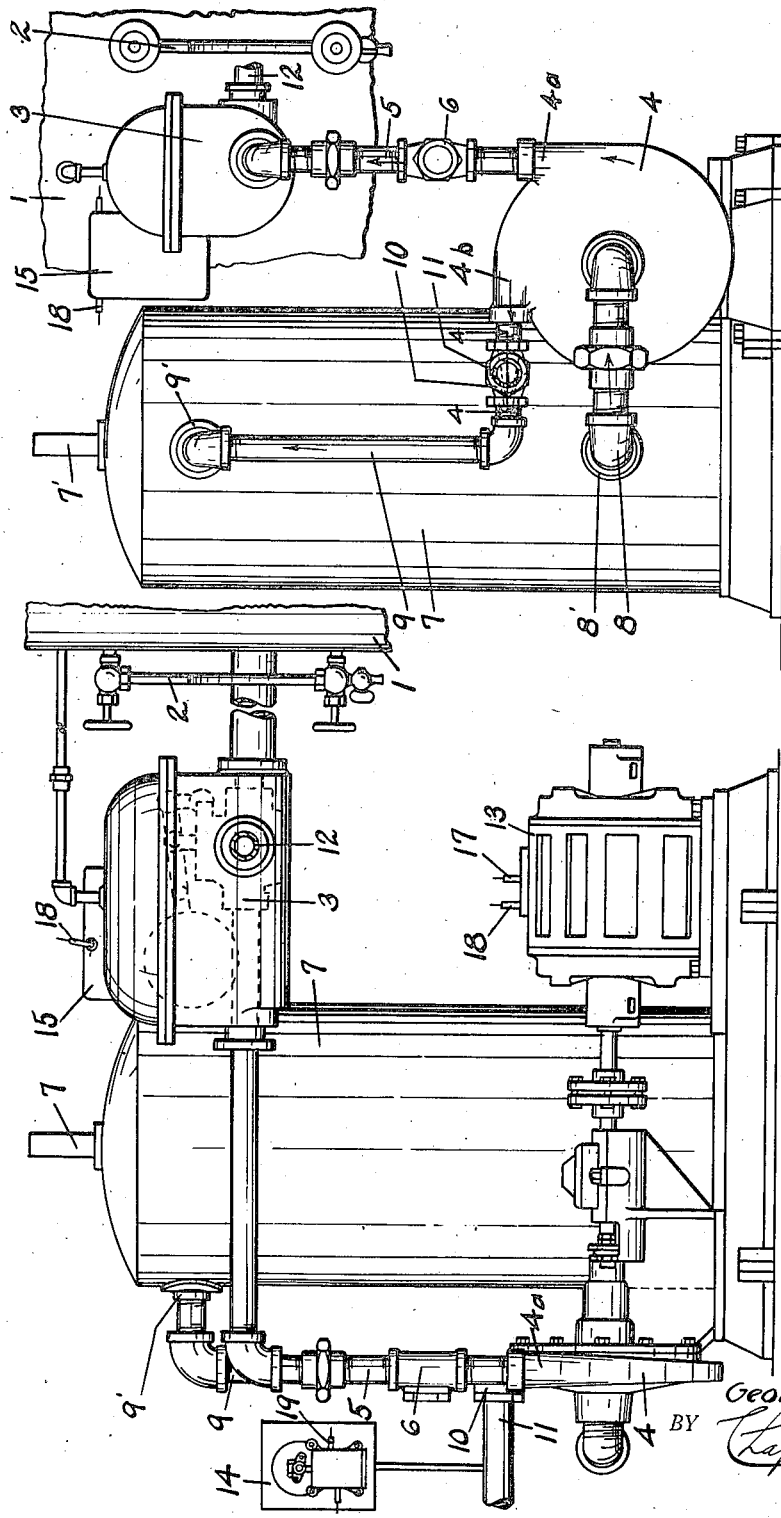

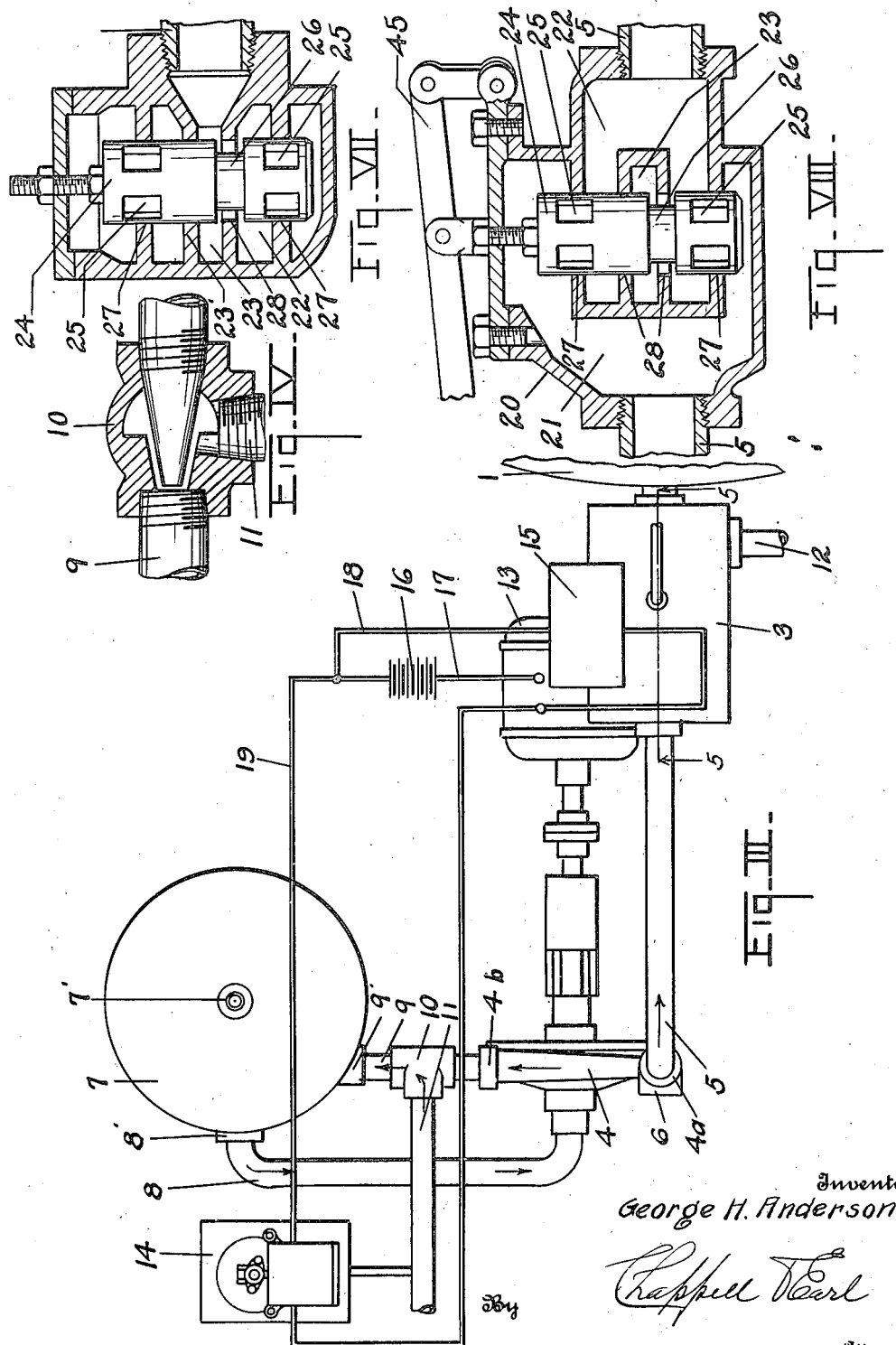

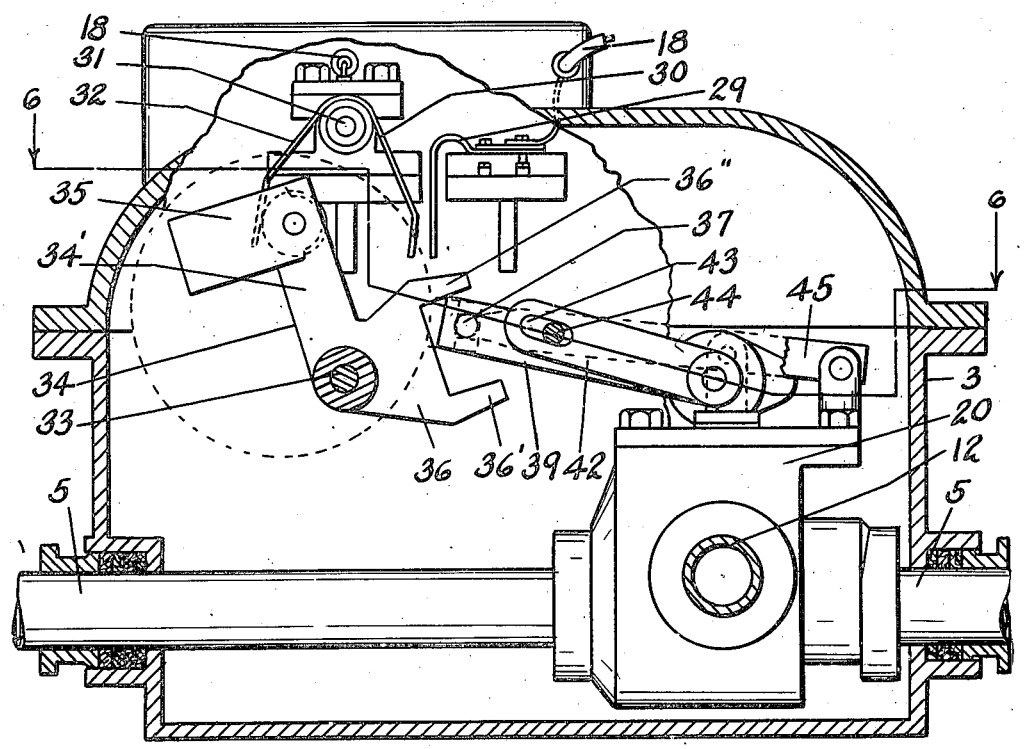
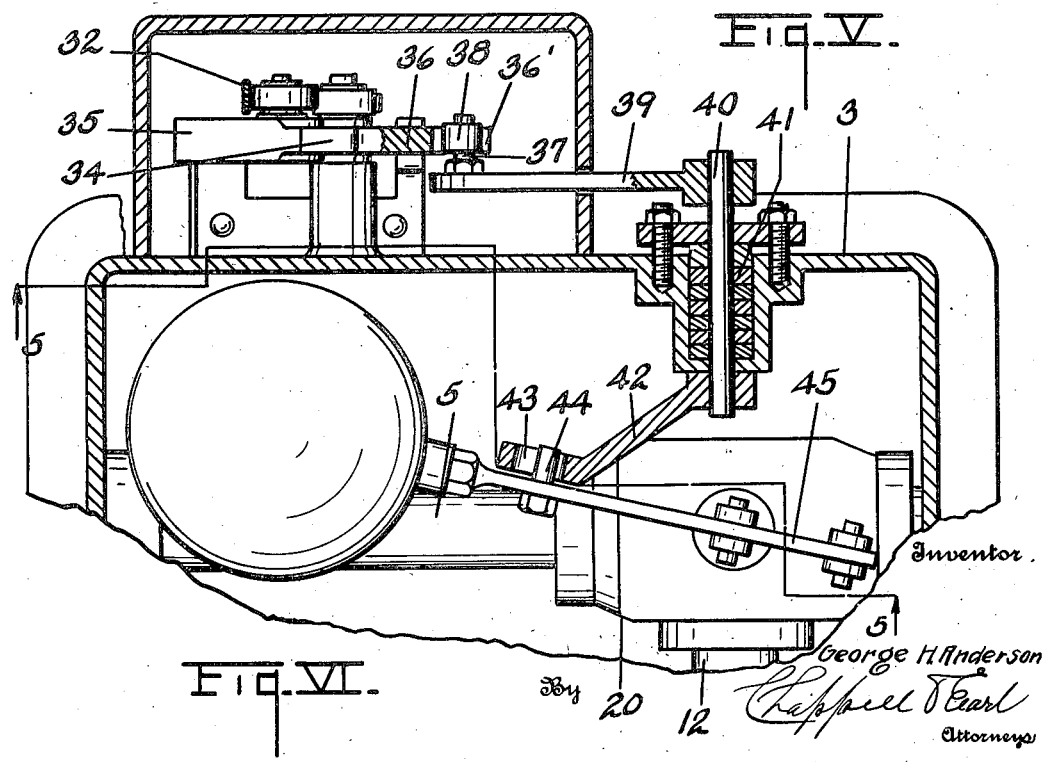

1,445,061

UNITED STATES PATENT OFFICE.

GEORGE H. ANDERSON, OF KALAMAZOO, MICHIGAN.

VACUUM HEATING SYSTEM AND AUTOMATIC AND SAFETY CONTROL MEANS THEREFOR.

Application filed July 5, 1921. Serial No. 482,475.

*To all whom it may concern:*

Be it known that I, GEORGE H. ANDERSON, a citizen of the United States, residing at the city and county of Kalamazoo, State of Michigan, have invented certain new and useful Improvements in Vacuum Heating Systems and Automatic and Safety Control Means Therefor, of which the following is a specification.

This invention relates to improvements in vacuum heating systems and automatic and safety control means therefor.

This invention has for its first main object, to provide a connected and coordinated unitary means for the proper automatic maintenance of a partial vacuum in a heating system, the automatic return of the water of condensation to the boiler of said heating system and to maintain the proper water level in the boiler and automatic safety control means in that behalf.

Second, to provide an effective and simple automatic means for the maintenance of the necessary vacuum in the vacuum heating system.

Third, to provide effective automatic means for returning the water of condensation to the boiler of the plant.

Fourth, to provide automatic and dual control of the electric driving means for creating the vacuum and returning the water to the plant.

Fifth, to provide effective means of automatically insuring the proper maintenance of the water level in the boiler by auxiliary means independent of the general structure of the heating system and plant.

Objects which pertain to details and economies of construction and operation will definitely appear from the detailed description to follow. The invention is clearly defined and pointed out in the claims.

A structure which is a preferred embodiment of my invention is fully illustrated in the accompanying drawings forming a part of this specification in which:

Fig. I is a diagrammatic side elevation view of the apparatus and means fully assembled, less the electric wiring, the boiler being shown fragmentarily and the sources of water supply being merely indicated by connections thereto as my invention does not pertain to such details.

Fig. II is an end elevation of the structure being taken from the left hand end of Fig. I.

Fig. III is a diagrammatic plan view of the structure of Figs. I and II including the wiring system which is shown diagrammatically.

Fig. IV is an enlarged detail sectional view on the line 4—4 of Fig. II of the injector structure for maintaining the vacuum in the heating coils or radiators.

Fig. V is an enlarged detail longitudinal sectional view on the irregular section line 5—5 of Figs. III and VI through the float valve structure showing diagrammatically the electric switch control means connected therewith.

Fig. VI is a detail horizontal sectional view on the irregular line 6—6 of Figs. I and V showing details of the electric switch connecting means therefor.

Fig. VII is an enlarged detail sectional view through the valve control means and the auxiliary water connection taken on the sectional line 7—7 of Figs. I, III, V and VI.

Fig. VIII is a detail sectional view of the valve structure taken on the line corresponding to line 8—8 of Figs. II, III, VI and VII showing further details of the automatic valve structure.

In the drawings the sectional views are taken looking in the direction of the little arrows at the ends of the section lines and similar numerals of reference refer to similar parts throughout the several views.

Considering the various parts of the structure by their numbers, 1 is the boiler shown fragmentarily. 2 is the water gauge therefor. 3 is the automatic float valve control means. 4 is the centrifugal pump having the plural discharge deliveries 4<sup>A</sup> and 4<sup>B</sup>. 5 is the pipe connection from the delivery 4<sup>A</sup> to the boiler through the float valve control structure. 6 is the check valve in said connection. 7 is the receiving and storage tank for the water of condensation from the heating coils or radiators with an air vent 7' at the top. The suction of the pump 4 is connected to the bottom of tank 7 by the pipe 8 through the flange 8' and the delivery 4<sup>B</sup> of the pump is connected to the upper part through the pipe 9 and flange 9'. 10 is the injector inserted in the pipe 9. 11 is the pipe connecting to the heating coils or radiators where partial vacuum is to be maintained. 12 is the connection to the auxiliary water supply such as a water main delivering through the main valve to the boiler as will be hereafter explained. 13 is the electric motor preferably directly connected to drive the centrifugal pump 4. 14 is the automatic vacuum electric switch control of a well-known construction connected to the heating coils or radiators for cutting out the electric motor when a proper degree of vacuum is reached and to turn on the motor when the vacuum is insufficient. 15 is generally the electric switch control associated with the float valve for connecting the motor to throw in the same whenever the water falls below the predetermined level. This is dual with the vacuum switch. Either switch will turn on the current, both must act to cut it off.

In Fig. III is the wiring diagram showing the main source of supply 16 which may be a battery or any other means of supplying current, one side of which is connected at 17 to the motor. The current is divided and one branch 19 extends through the automatic vacuum control switch 14 and the other branch circuit 18 extends through the float control 15 to the battery as indicated.

The float valve structure I am making the subject matter of a concurrent patent application but will briefly describe sufficiently to show its action in this behalf.

The pipe 5 leads to the casing 20 of the valve having an outer chamber 21 and an inner chamber 22. An auxiliary central chamber 23 is provided formed by casing 23'. The chamber 22 is connected to the boiler by the continuation of pipe 5.

A balanced piston valve 24 is vertically disposed through bores 27 in the outer casing and through bores 28 in the central casing 23' of the central auxiliary chamber 23. This piston valve 24 is provided with lateral port openings 25 at its upper and lower end to open and connect the outer valve chamber 21 with the inner valve chamber 22.

A reduced portion 26 forms a port through the bores 28 to connect the auxiliary chamber 23 to the inner chamber 22 (see Figs. VII and VIII).

In the up position the valve is completely closed. When it is lowered slightly through the bores 27 the outer valve chamber 21 connects with the inner valve chamber 22 and delivers water through the pipe 5 to the boiler. When the piston valve is lowered a little further as seen in Figs. VII and VIII, the auxiliary chamber 23 is also connected to deliver water from the auxiliary source 13 through the pipe 5 into the boiler.

From this arrangement it will be seen that the valve structure controls the supply of water delivered to the boiler. This is ordinarily supplied through the supply pipe 5. However, in the event of failure of the system the float permits the valve to drop and connects the auxiliary supply 12.

The float also serves to close the branch circuit 18 to the motor 13 when the water level falls, thereby turning on the motor and starting the centrifugal pump 4.

The branch circuit 18 is opened and a terminal 29, is put at one side and a switch 30 to co-operate therewith and close the circuit on the other side. The switch 30 is pivoted at 31 and is provided with an arm 32 extending downwardly in U-shaped relation to the switch 30. In practice this is made continuous therewith. This switch is actuated by a lever 34 fulcrumed at 33 having an upwardly projecting arm 34' provided with a laterally projecting weight 35 at its upper end. A roller extends from the side of the lever to cooperate with the switch 30 on the one side and the lever 32 on the other for closing or breaking the circuit as the case may be.

A bifurcated arm 36 extends laterally, being provided with bifurcations 36' and 36" disposed to co-act with the laterally projecting pin 37 carrying the roller 38 on the rock shaft arm 39 supported on the rock shaft 40. The rock shaft 40 extends through the side of the casing and is supported in the stuffing box bearing 41. A rock shaft arm 42 is secured to its inner end. This is slotted at 43 and coacts with the pin 44 on the side of the float lever 45.

It will thus be seen from an inspection of Fig. V that when the float descends to a position such as is indicated in Fig. VIII the pin 44 will act upon the arm 42 of the lever which it engages at the slot 43 carrying the same downwardly thereby turning the arm 42 downward and carrying the roller 38 into contact with the lower bifurcation 36' of the bifurcated arm 36 of the lever. This will tip the lever until the weight 35 passes the center of gravity and swings against the switch 30, closing the same and starting the motor 13 if, perchance, the motor should then be at rest. The motor will then drive the pump until the level of the water is such that the float is raised to the up position and acting upon the upper bifurcation 36" until the lever 34 is thrown in the opposite direction past the center of gravity when it will drop against the arm 32 and break the circuit so that the motor will be stopped and the pump will thus be stopped unless the circuit be closed by the automatic vacuum switch to actuate the pump for the purpose of creating the desired vacuum in the heating coils or radiators of the system.

From this description it will be clear that my improved system is very compact and provides automatic means for maintenance.

It is very clear that the various parts coact to that end and that there is special advantage in making use of the single electric motor and pump with the dual features presented. However, the various devices are capable of independent operation.

I have filed concurrently herewith patent application on the improved rotary pump and also a concurrent patent application on the improved valve mechanism and desire to state that in the system the different features could be made use of independently or with other independent means. For these reasons I desire to claim the combination as it here appears in detail specifically and also broadly, and also sub-combinations and special features pertaining to the system as pointed out in the appended claims.

Having thus described my invention, what I claim as new and desire to secure by Letters Patent, is:

1. In an apparatus for use in a vacuum system steam heating plant, the combination with the boiler of a storage tank for the water of condensation, a centrifugal pump with double discharge openings, the intake thereof being connected toward the bottom of said storage tank, a condensation delivery pipe connecting one pump discharge to the upper portion of said storage tank, an injector in the said condensation delivery pipe, a pipe connected from the heating coil system to said injector to draw therefrom and deliver condensation to the said storage tank and create vacuum in said system, a boiler feed connection from the other pump discharge to the steam boiler of the heating system below its water line, a float valve means, suitably encased, interposed in said boiler feed connection, the upper portion of which is connected to the steam space of said boiler, the said float valve being a three way valve adapted to control the delivery of water from the centrifugal pump to the boiler and to admit water from an auxiliary supply, a connection from an auxiliary supply to said valve, an electric motor connected to drive said pump, a divided electric circuit delivering to the said motor, a vacuum control switch disposed in one branch of said circuit and connected to be actuated by the vacuum of said system, and a second automatic switch connected to be actuated by the float of the float valve for closing the second circuit when the float is down and for opening the same when the float is up, coacting substantially as described for the purpose specified.

2. In an apparatus for use in a vacuum system steam heating plant, the combination with the boiler of a storage tank for the water of condensation, a centrifugal pump with double discharge openings, the intake thereof being connected toward the bottom of said storage tank, a condensation delivery pipe connecting one pump discharge to the upper portion of said storage tank, an injector in the said condensation delivery pipe, a pipe connected from the heating coil system to said injector to draw therefrom and deliver condensation to the said storage tank and create vacuum in said system, a boiler feed connection from the other pump discharge to the steam boiler of the heating system below its water line, a float valve means suitably encased interposed in said boiler feed connection, the upper portion of which is connected to the steam space of said boiler, adapted to control the delivery of water from the centrifugal pump to the boiler, an electric motor connected to drive said pump, a divided electric current delivering to the said motor, a vacuum control switch disposed in one branch of said circuit and connected to be actuated by the vacuum of said system and a second automatic switch connected to be actuated by the float of the float valve for closing the said second branch circuit when the float is down and for opening the same when the float is up, coacting substantially as described for the purpose specified.

3. In an apparatus for use in a vacuum system steam heating plant, the combination with the boiler of a storage tank for the water of condensation, a centrifugal pump with double discharge openings, the intake thereof being connected toward the bottom of said storage tank, a condensation delivery pipe connecting one pump discharge to the upper portion of said storage tank, an injector in the said condensation delivery pipe, a pipe connected from the heating coil system to said injector to draw therefrom and deliver condensation to the said storage tank and create vacuum in said system, a boiler feed connection from the other pump discharge to the steam boiler of the heating system below its water line, a float valve means suitably encased interposed in said boiler feed connection, the upper portion of which is connected to the steam space of said boiler, adapted to control the delivery of water from the centrifugal pump to the boiler, an electric motor connected to drive said pump, an electric current delivering to the said motor, a vacuum control switch disposed in said circuit and connected to be actuated by the vacuum of said system, coacting substantially as described for the purpose specified.

4. In an apparatus for use in a vacuum system steam heating plant, the combination with the boiler of a storage tank for the water of condensation, a centrifugal pump with double discharge openings, the intake thereof being connected toward the bottom of said storage tank, a condensation delivery pipe connecting one pump discharge to the upper portion of said storage tank, an injector in the said condensation delivery pipe, a pipe connected from the heating coil system to said injector to draw therefrom and deliver condensation to the said storage tank and create vacuum in said system, a boiler feed connection from the other pump discharge to the steam boiler of the heating system below its water line, a float valve means suitably encased interposed in said boiler feed connection, the upper portion of which is connected to the steam space of said boiler, adapted to control the delivery of water from the centrifugal pump to the boiler, an electric motor connected to drive the said pump, electric current delivering to the said motor and an automatic switch connected to be actuated by the float of the float valve for closing the said circuit when the float is down and for opening the same when the float is up, coacting substantially as described for the purpose specified.

5. In an apparatus for use in a vacuum system steam heating plant, the combination with the boiler of a storage tank for the water of condensation, pump means with an intake connected to the bottom of said tank and discharging into the top thereof, an injector in said discharge connected to draw the condensation from the coils of the steam heating system, a boiler feed drawing from said tank, a float valve means, suitably encased, interposed in the said boiler feed delivery, the upper portion of which is connected to the steam space of said boiler, the float valve being a three-way valve adapted to control the delivery of water from the pump to the boiler and to admit water from an auxiliary supply, a connection from an auxiliary supply to said valve, electric motor means connected to drive said pump means, a divided electric circuit delivering to said motor means, a vacuum control switch disposed in one branch of said circuit and connected to be actuated by the vacuum of said system, and a second automatic switch connected to be actuated by the float of the float valve for closing the second branch circuit when the float is down and for opening the same when the float is up, coacting for the purpose specified.

6. In an apparatus for use in a vacuum system steam heating plant, the combination with the boiler of a storage tank for the water of condensation, pump means with an intake connected to the bottom of said tank and discharging into the top thereof, an injector in said discharge connected to draw the condensation from the coils of the steam heating system, a boiler feed drawing from said tank, a float valve means, suitably encased, interposed in the said boiler feed delivery, the upper portion of which is connected to the steam space of said boiler, adapted to control the delivery of water from the pump to the boiler, electric motor means connected to drive the said pump means, a divided electric circuit delivering to said motor means, a vacuum control switch disposed in one branch of said circuit and connected to be actuated by the vacuum of said system, and a second automatic switch connected to be actuated by the float of the float valve for closing the second of the float valve for closing the second branch circuit when the float is down and for opening the same when the float is up, coacting for the purpose specified.

7. In an apparatus for use in a vacuum system steam heating plant, the combination with the boiler of a storage tank for the water of condensation, pump means with an intake connected to the bottom of said tank and discharging into the top thereof, an injector in said discharge connected to draw the condensation from the boilers of the steam heating system, a boiler feed drawing from said tank, a float valve means, suitably encased, interposed in the said boiler feed delivery, the upper portion of which is connected to the steam space of said boiler, adapted to control the delivery of water from the pump to the boiler, electric motor means connected to drive said pump means, an electric circuit delivering to said motor means, and a vacuum control switch disposed in said circuit and connected to be actuated by the vacuum of said system, coacting for the purpose speccified.

8. In an apparatus for use in a vacuum system steam heating plant, the combination with the boiler of a storage tank for the water of condensation, pump means with an intake connected to the bottom of said tank and discharging into the top thereof, an injector in said discharge connected to draw the condensation from the coils of the steam heating system, a boiler feed drawing from said tank, a float valve means, suitably encased, interposed in the said boiler feed delivery, the upper portion of which is connected to the steam space of said boiler, adapted to control the delivery of water from the pump to the boiler, electric motor means connected to drive said pump means, an electric circuit delivering to said motor means, and an automatic switch connected to be actuated by the float of the float valve for closing the circuit when the float is down and for opening the same when the float is up, coacting for the purpose specified.

9. In an apparatus for use in a vacuum system steam heating plant, the combination with the boiler of a storage tank for the water of condensation, a centrifugal pump with double discharge with its intake connected to the bottom of said storage and one discharge to the top of said tank and the other discharge connected to feed the boiler, an injector means in the tank discharge connected to draw condensation from the heating system and create vacuum therein, a float means in the boiler feed for controlling the feed to the boiler, an electric motor for driving said centrifugal pump, a divided circuit, a vacuum control switch means for controlling one branch thereof and a switch with connections to the vacuum control for controlling the other branch thereof, coacting as specified.

10. In an apparatus for use in a vacuum system steam heating plant, the combination with a boiler of a storage tank for the water of condensation, a centrifugal pump with double discharge with its intake connected to the bottom of said storage and one discharge to the top of said tank and the other discharge connected to feed the boiler, an injector means in the tank discharge connected to draw condensation from the heating system and create vacuum therein, a float means in the boiler feed for controlling the feed to the boiler and means for driving said centrifugal pump coacting as specified.

11. In an apparatus for use in a vacuum system steam heating plant, the combination with the boiler of a storage tank for the water of condensation, a centrifugal pump with double discharge with its intake connected to the bottom of said storage and one discharge to the top of said tank and the other discharge connected to feed the boiler, an injector means in the tank discharge connected to draw condensation from the heating system and create vacuum therein and automatic means to control said boiler feed.

In witness whereof, I have hereunto set my hand and seal.

GEORGE H. ANDERSON. [L. S.]